Patented June 12, 1934

1,962,941

UNITED STATES PATENT OFFICE 1,962,941

PROCESS OF OBTAINING HIGHER MOLECULAR ALCOHOLS

Walther Schrauth, Berlin-Dahlem, Germany, assignor, by mesne assignments, to "Unichem" Chemikalien Handels A.-G., Zurich, Switzerland, a corporation of Switzerland No Drawing. Application February 11, 1932, Serial No. 592,442

2 Claims. (Cl. 260—156)

The present invention relates to improvements in processes of obtaining higher alcohols and more particularly cetyl alcohol.

The higher molecular alcohols, that is to say, those containing 8 or more carbon atoms, are becoming more and more important in the industry as many new uses for such alcohols and their derivatives are being developed. It is accordingly of increasing importance to develop new sources of such alcohols and to provide commercially practicable processes for obtaining the same.

The present invention has for an object to provide an economical and effective process for producing higher molecular alcohols.

A further object is to provide an improved process for obtaining a high yield of alcohols from sperm oil, and the like.

A further object is to provide an improved product.

With these and other objects in view the invention provides a method whereby a high yield of higher alcohols can be obtained from sperm oil or similar products.

According to the preferred embodiment of the invention sperm oil is saponified and the saponified oil is then distilled to obtain higher molecular alcohols and more particularly cetyl alcohol.

In carrying out the process the sperm oil is saponified by a suitable saponifying agent, such as calcium oxide, sodium potassium or magnesium salts, and the like. For example, and preferably, calcium oxide is used in the proportions of 4 parts of calcium oxide, (which may contain about 5% water of crystallization) to 3 parts of sperm oil. The mixture of sperm oil and the saponifying agent is heated in a suitable retort to promote saponification to a temperature of 250° to 350° C. for about six hours, the mixture being stirred occasionally. When the saponification is complete, the mixture may be cooled.

The mass may be distilled to obtain the alcohols produced. During the heating of the mixture the water will first be eliminated at a temperature of about 100° C. with attendant frothing of the mixture. When the frothing ceases, the temperature should be raised to distill off the alcohols. The mixture of alcohols obtained from the sperm oil will ordinarily amount to 40 to 45% of the quantity of the raw material and 50 to 60% of the mixture will be cetyl alcohol. The yield of cetyl alcohol varies with the quality of the sperm oil.

The cetyl alcohol can be separated from the liquid alcohols by passing the same through a filter press operating at a temperature of 10° to 30° C. or the mixture may be fractionally distilled to separate the different alcohols. If fractional distillation is employed the cetyl alcohol may best be distilled off between the temperatures of 330° and 350° C. It will distill off as white fumes, which will cool to form an oily product which later solidfies as a white fatty body of waxlike character. The greater part of the liquid alcohols obtained is oleic alcohol.

I claim:

1. The herein described process for producing cetyl alcohol which comprises saponifying sperm oil at a temperature approximating 250° to 300° C. for approximately six hours, separating the resulting alcohols from the reaction product by distillation and cooling the alcohols to a temperature of 10° to 30° C. and filtering the same to separate the cetyl alcohol substantially as described.

2. In the process of producing cetyl alcohol by the saponification of sperm oil and distillation of the alcohols produced thereby from the remaining reaction products the step which comprises cooling the alcoholic distillate to a temperature within the range of 10° C. to 30° C. and filtering the cooled distillate to remove the cetyl alcohol therefrom.

WALTHER SCHRAUTH.